US011067034B2

(12) United States Patent
Kopecek

(10) Patent No.: US 11,067,034 B2
(45) Date of Patent: Jul. 20, 2021

(54) LIMITED FLOW THRUST REVERSER ACTUATING

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 400 days.

(21) Appl. No.: 16/294,146

(22) Filed: Mar. 6, 2019

(65) Prior Publication Data

US 2020/0025143 A1 Jan. 23, 2020

Related U.S. Application Data

(63) Continuation of application No. 15/422,726, filed on Feb. 2, 2017, now Pat. No. 10,227,951.

(51) Int. Cl.
*F02K 1/60* (2006.01)
*F02K 1/76* (2006.01)

(52) U.S. Cl.
CPC ............... *F02K 1/763* (2013.01); *F02K 1/60* (2013.01); *F05D 2270/051* (2013.01); *F05D 2270/18* (2013.01); *F05D 2270/64* (2013.01)

(58) Field of Classification Search
CPC ........ F01K 1/60; F01K 1/763; F05D 2270/64; F05D 2270/65
See application file for complete search history.

(56) References Cited

U.S. PATENT DOCUMENTS 3,730,219 A  5/1973 Tennis
4,031,813 A  6/1977 Walters et al.
(Continued)

FOREIGN PATENT DOCUMENTS

CN  102536513   7/2012
CN  102918251   2/2013
(Continued)

OTHER PUBLICATIONS

International Search Report and Written Opinion of the International Searching Authority issued in International Application No. PCT/US2018/15978 dated Apr. 20, 2018; 11 pages.
International Preliminary Report on Patentability in International Application No. PCT/US2018/015978, dated Aug. 6, 2019, 8 pages.
Chinese Office Action in Chinese Application No. 201880023269.8, dated Apr. 24, 2020, 10 pages with English translation.

*Primary Examiner* — Andrew H Nguyen
(74) *Attorney, Agent, or Firm* — Fish & Richardson P.C.

(57) ABSTRACT

An engine assembly includes a nacelle configured to at least partially surround an engine and a thrust reverser coupled to the nacelle. The thrust reverser includes: a thrust-reversing element movable relative to the nacelle between a stowed position and a deployed position; a hydraulic actuator operably coupled to move the thrust-reversing element; and a fluid control system configured to operate the hydraulic actuator. The fluid control system includes: a directional control unit including a directional control valve operable to selectively route fluid between a pressurized fluid source, the actuator, and a fluid return reservoir; one or more bypass fluid lines providing fluid communication between the actuator and the fluid return reservoir independent of the directional control valve; and a flow limiter residing between the pressurized fluid source and the directional control valve, the flow limiter configured to inhibit a pressure draw by the actuator from surpassing a predetermined threshold.

11 Claims, 5 Drawing Sheets

(56) References Cited

U.S. PATENT DOCUMENTS

| | | | |
|---|---|---|---|
| 4,136,753 A | 1/1979 | Merkel | |
| 4,210,066 A | 7/1980 | Aldrich | |
| 4,297,844 A | 11/1981 | Halin et al. | |
| 4,391,409 A * | 7/1983 | Scholz | F02K 1/72 |
| | | | 239/265.29 |
| 4,598,626 A | 7/1986 | Walters et al. | |
| 4,840,111 A | 6/1989 | Garnjost | |
| 5,046,312 A | 9/1991 | Tsuda et al. | |
| 5,329,767 A | 7/1994 | Hewett | |
| 5,479,901 A * | 1/1996 | Gibson | F02M 59/466 |
| | | | 123/472 |
| 5,497,805 A | 3/1996 | Sunamura et al. | |
| 5,651,390 A | 7/1997 | Ishihama et al. | |
| 5,768,973 A | 6/1998 | Cochran | |
| 6,390,783 B1 | 5/2002 | Wong et al. | |
| 6,454,542 B1 | 9/2002 | Back | |
| 6,467,264 B1 | 10/2002 | Stephenson et al. | |
| 6,871,574 B2 | 3/2005 | Barber | |
| 6,892,534 B2 | 5/2005 | Silva et al. | |
| 7,506,842 B2 | 3/2009 | Jones | |
| 7,958,907 B2 | 6/2011 | Nishikawa et al. | |
| 8,616,495 B2 | 12/2013 | Ernis et al. | |
| 2003/0121258 A1 | 7/2003 | Yoshino | |
| 2004/0068977 A1* | 4/2004 | McKay | F02K 1/763 |
| | | | 60/226.2 |
| 2005/0028763 A1 | 2/2005 | Diehl et al. | |
| 2015/0052884 A1 | 2/2015 | Bracey | |
| 2016/0290283 A1 | 10/2016 | Vaughan et al. | |
| 2016/0333824 A1* | 11/2016 | Le Coq | F02K 1/763 |

FOREIGN PATENT DOCUMENTS

| | | |
|---|---|---|
| EP | 1090232 A1 | 4/2001 |
| EP | 1398493 A1 | 3/2004 |
| EP | 2466101 A2 | 6/2012 |
| KR | 20140112847 A | 9/2014 |

* cited by examiner

LIMITED FLOW THRUST REVERSER ACTUATING

CROSS-REFERENCE TO RELATED APPLICATIONS

This application is a continuation application of and claims the benefit of priority to U.S. application Ser. No. 15/422,726, filed on Feb. 2, 2017, the contents of which are hereby incorporated by reference.

TECHNICAL FIELD

This specification generally relates to thrust reversers for engine assemblies, and more particularly to actuation systems for operating such thrust reversers with limited fluid flow demand.

BACKGROUND

Thrust reversers are commonly incorporated in aircraft turbine engines. The role of the thrust reverser is to improve the braking capability of the aircraft upon landing by redirecting fluid flow through the engine to provide a counterthrust opposing the direction of travel. Conventional thrust reverser actuation systems place a large hydraulic flow demand on the aircraft hydraulic pump. To limit flow demand, regenerative-type directional control valves are often utilized. These directional control valves permit fluid flowing from the retract or "stow" chambers of the actuators to be recirculated to the actuator deploy chambers during deployment of the thrust reverser. The recirculation flow can be selectively implemented as an external aiding load is applied to the actuators during deployment. But, even this technique is insufficient to keep the flow demand below the limit of the hydraulic pump capacity in certain new aircraft designs.

SUMMARY

In one aspect, an engine assembly includes a nacelle configured to at least partially surround an engine; and a thrust reverser coupled to the nacelle. The thrust reverser includes: a thrust-reversing element movable relative to the nacelle between a stowed position and a deployed position; a hydraulic actuator operably coupled to move the thrust-reversing element between the stowed position and the deployed position; and a fluid control system configured to operate the hydraulic actuator. The fluid control system includes: a directional control unit including a directional control valve operable to selectively route fluid between a pressurized fluid source, the actuator, and a fluid return reservoir; one or more bypass fluid lines providing fluid communication between the actuator and the fluid return reservoir independent of the directional control valve; and a flow limiter residing between the pressurized fluid source and the directional control valve, the flow limiter configured to inhibit a pressure draw by the actuator from surpassing a predetermined threshold.

In another aspect, a fluid control system is configured to operate a hydraulic actuator coupled to a thrust-reversing element coupled to a nacelle of an engine assembly. The fluid control system includes: a directional control unit including a directional control valve operable to selectively route fluid between a pressurized fluid source, the hydraulic actuator, and a fluid return reservoir; one or more bypass fluid lines providing fluid communication between the actuator and the fluid return reservoir independent of the directional control valve; and a flow limiter residing between the pressurized fluid source and the directional control valve, the flow limiter configured to inhibit a pressure draw by the actuator from surpassing a predetermined threshold.

In yet another aspect, a method of operating an engine thrust reverser having a thrust-reversing element movable between a stowed position and a deployed position includes transitioning the thrust-reversing element from the stowed position to the deployed position by: conveying a primary fluid flow from a pressurized fluid source to a hydraulic actuator coupled to the thrust-reversing element; conveying a secondary fluid flow from a fluid return reservoir to the hydraulic actuator, the second fluid flow being separate from the primary fluid flow; and, while conveying the primary and second fluid flows, limiting the primary fluid flow to a predetermined flow threshold.

In some examples of the above-described aspects, the fluid control system further includes an isolation control unit including an isolation control valve operable to selectively inhibit or permit fluid flow between the directional control valve and the pressurized fluid source and fluid return reservoir; and the isolation control unit further includes a piloted check valve operable in a first stage, where fluid flow from the fluid return reservoir to the actuator through the bypass lines is inhibited, and a second stage, where fluid flow from the fluid return reservoir to the actuator is uninhibited. In some examples, the isolation control unit further includes a solenoid valve coupled to both the isolation control valve and the piloted check valve, and configured to concurrently control operation of the isolation control valve and the piloted check valve. In some examples, the solenoid valve is configured to initiate transition of the piloted check valve from the first stage to the second stage in response to receiving a thrust-reverser-deploy command.

In some examples of the above-described aspects, the directional control valve is operable in a deploy stage, where fluid from the fluid source is routed to both a deploy chamber and a stow chamber of the actuator, and a stow stage, where fluid from the fluid source is routed only to the stow chamber of the actuator; and, when the directional control valve is in the deploy stage, the deploy and stow chambers are placed in fluid communication with one another to permit fluid recirculation.

In some examples of the above-described aspects, the fluid control system further includes an anti-cavitation check valve residing on the bypass fluid lines, the check valve configured to permit fluid flow from the fluid return reservoir to the actuator, while inhibiting fluid flow from the actuator to the fluid return reservoir. In some examples, the anti-cavitation check valve is configured to permit fluid flow when the pressure in a deploy chamber of the actuator is less than the pressure at the fluid return reservoir.

In some examples of the above-described aspects, the flow limiter includes at least one of a flow regulator or a flow restrictor.

In some examples of the above-described aspects, the flow limiter is incorporated in the directional control unit.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Various elements of the drawings may be exaggerated or illustrated schematically to better show the features, process steps, and results. Like reference numbers and designations in the various drawings may indicate like elements.

DETAILED DESCRIPTION

Various embodiments of the present disclosure are directed to thrust reverser actuation systems ("TRAS") that effectively limit flow demand placed on an onboard pressurized fluid source. In some examples, these TRAS limit flow demand and meet reverser-deploy timing requirements by restricting or regulating the flow from system pressure into the directional control valve ("DCV") while making up the shortfall in flow demand by routing return pressure into the hydraulic actuator deploy chambers. This flow-limiting technique can be implemented in conjunction with, or independent of, flow regeneration techniques.

A TRAS requires a relatively high fluid flow from the vehicle hydraulic system during the deploy cycle of the reverser, and a relatively low flow during the retract cycle. Meeting the flow demand to achieve the required reverser deploy time while not drawing greater system pressure flow than the onboard pump can provide is often problematic. If the maximum flow demand requirement cannot be met even with a regenerative type DCV, the bore of the actuator can be reduced and/or the allowed deploy time can be increased. These design options, however, have the negative consequences of either reducing the force authority of the TRAS or adversely affecting the time performance of the TRAS. One other option is to increase the size of the onboard pump. However, this may also be troublesome due to increased weight, cost, and form factor/envelope.

In some examples, the fluid flow rate requirement of a regenerative-type TRAS is equivalent to the velocity multiplied by the area of the rods of the actuators. However, the energy (pressure multiplied by volume) from this flow is only needed during the first portion of the deploy stroke when the load on the actuators is compressive. Certain embodiments of the present disclosure take advantage of the fact that the energy from the fluid is no longer needed once the load on the TRAS has changed from compression to tension in the presence of an "aiding load" (e.g., the force of surrounding airflow acting on the thrust reverser doors). To limit the flow demand of the TRAS, the flow from system pressure (which may be recirculated through the DCV) is supplemented with flow from the hydraulic fluid return reservoir when an aiding load is present.

Figure 1B:
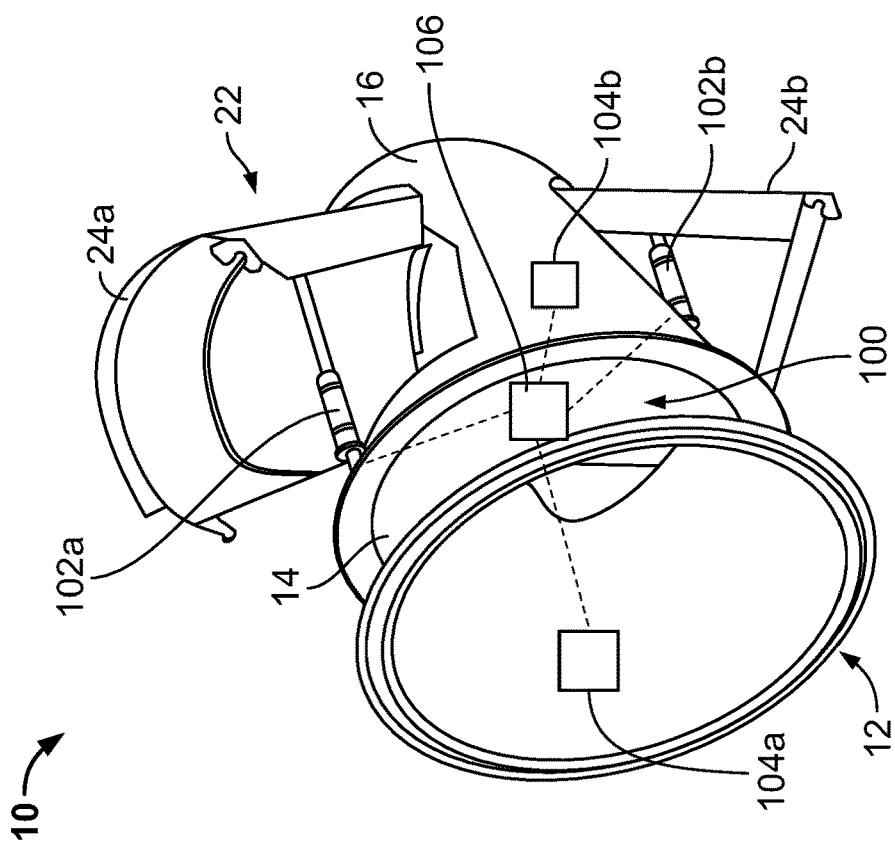
FIG. 1B is a front perspective view illustrating the engine assembly of FIG. 1A with the doors of the thrust reverser in a deployed position.
Figure 1A:
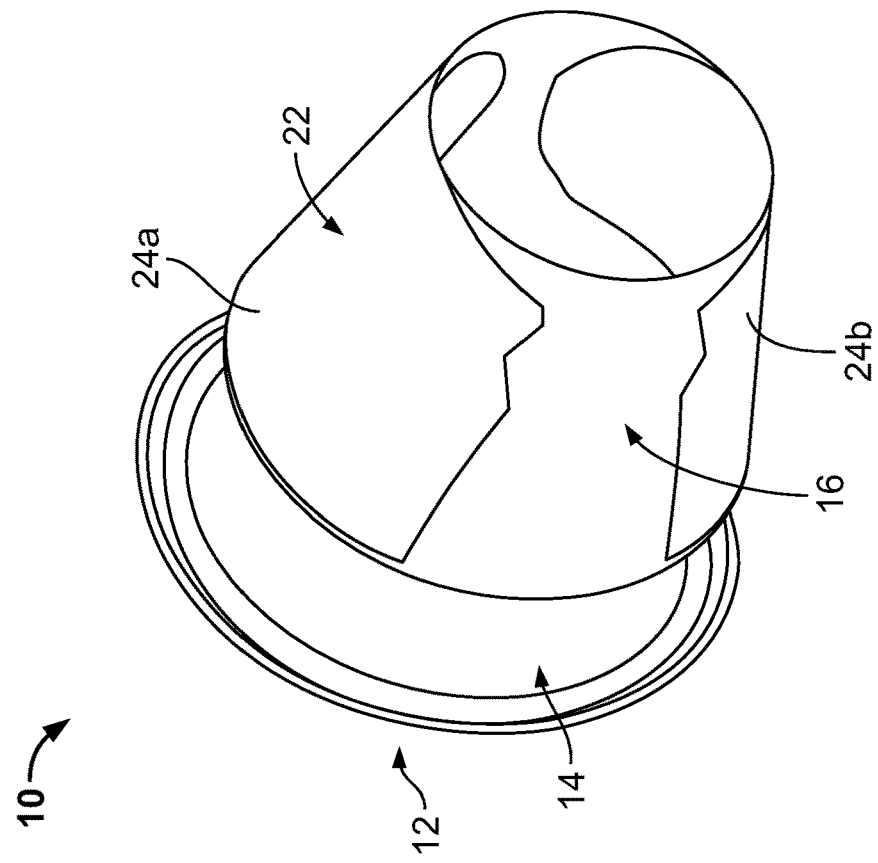
FIG. 1A is a rear perspective view illustrating a portion of an engine assembly with the doors of a thrust reverser in a stowed position.

FIGS. 1A and 1B illustrate an example engine assembly 10 in accordance with one or more embodiments of the present disclosure. In some embodiments, the engine assembly 10 may be incorporated in a powered vehicle (not shown), such as an aircraft. In this example, the engine assembly 10 includes a nacelle 12 supporting a thrust reverser 22. As shown, the nacelle 12 is an annular structure coupleable to the vehicle's frame for housing a turbine engine (e.g., a turbojet or turbofan engine) powering the vehicle. In this example, the nacelle 12 includes a front housing 14 and a rear housing 16. The front and rear housings 14,16 are tubular, frusto-conical components, with the rear housing 16 being mounted co-axially with the front housing 14. The front housing 14 is designed to receive the turbine engine, and the rear housing 16 is designed to support the thrust reverser 22. In this example, the thrust reverser 22 is a pivoting-door type arrangement, a clamshell configuration in particular. However, other suitable types of thrust reversers (e.g., cascade, target door or petal door type thrust reversers) may also be compatible with the actuation systems described herein.

The thrust reverser 22 includes a pair of thrust-reversing elements 24a,b and an actuation system 100 (shown schematically in FIG. 1B). The thrust-reversing elements 24a,b are shown in this example as bulkheads or "doors" pivotally mounted to the rear housing 16 of the nacelle 12. The doors 24a,b are shown in a stowed position, pivoted inward towards the nacelle 12, in FIG. 1A and in a deployed position, pivoted outward away from the nacelle 12, in FIG. 1B. The TRAS 100 is appropriately configured to control operation of the doors 24a,b, regulating movement between the stowed and deployed positions—e.g., based on one or more control signals. In this example, the TRAS 100 includes hydraulic actuators 102a,b, hydraulic locks 104a,b, and a directional control unit ("DCU") 106. Each of the hydraulic actuators 102a,b is operably coupled to move a respective one of the doors 24a,b between the stowed and deployed positions. The hydraulic actuators 102a,b are designed to provide linear movement, pushing the doors 24a,b outward from the stowed position to the deployed position and pulling the doors 24a,b inward from the deployed position to the stowed position. In this example, each of the hydraulic locks 104a,b are engageable with both of the doors 24a,b, such that either of the locks can independently prevent the unintentional deployment of both doors if the other lock becomes inoperable. The hydraulic locks 104a,b are configured to transition between an engaged state, where movement (e.g., deployment) of the doors 24a,b is inhibited, and a released state, where movement of the doors 24a,b is uninhibited. The DCU 106 is fluidically coupled (or placed in fluid communication with) to each of the hydraulic actuators 102a,b and each of the hydraulic locks 104a,b. The DCU 106 receives pressurized fluid from a fluid source and selectively ports the fluid to the hydraulic actuators 102a,b and hydraulic locks 104a,b to operate these components via hydraulic pressure.

Note that the term "fluidically coupled" is used in the present disclosure when referring to components that are capable of being placed in a condition, state, or stage where fluid communication between them is permitted. Further note that the terms "fluid communication" and "fluidically coupled" are used synonymously throughout the present disclosure.

Figure 2A:
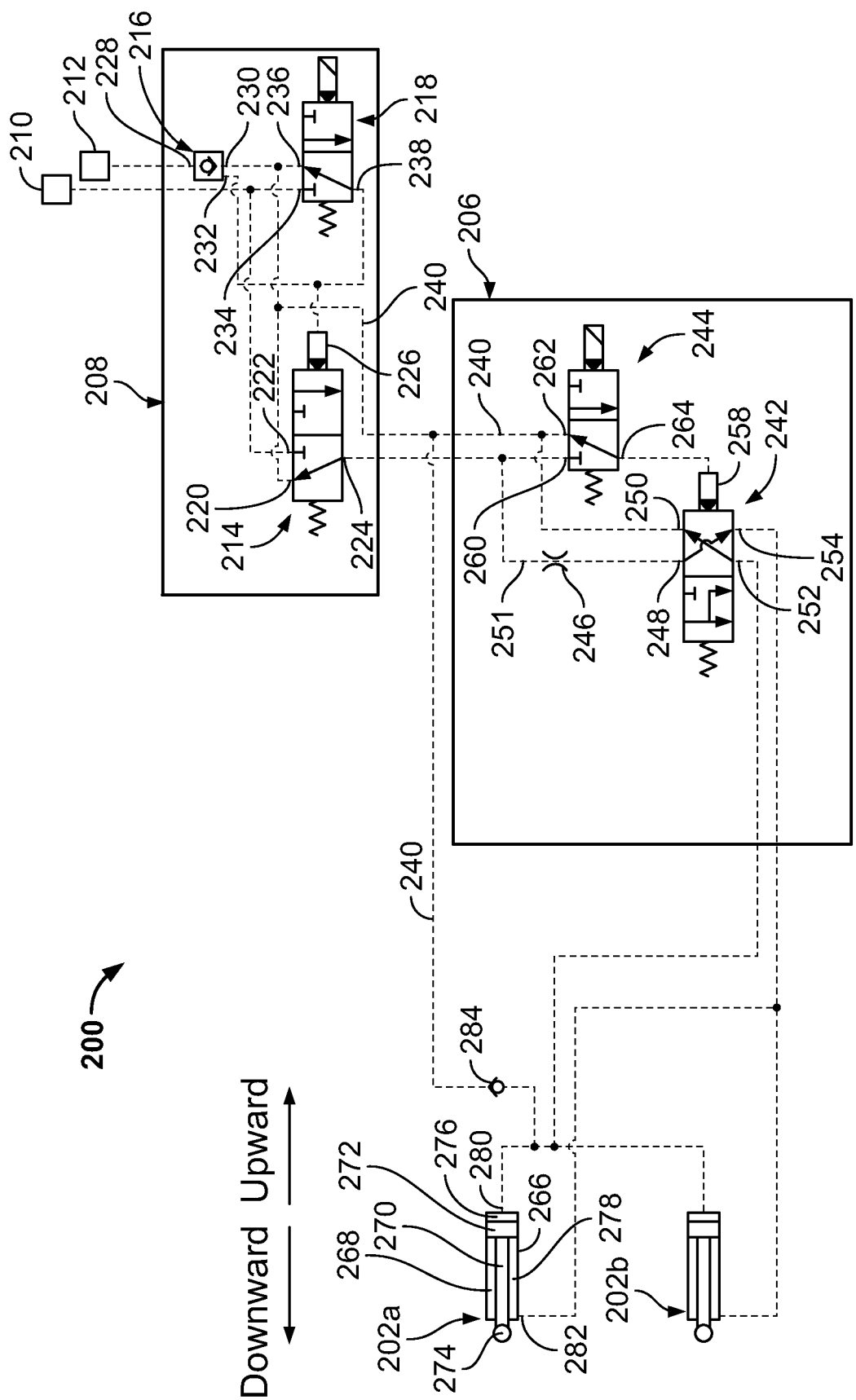
FIGS. 2A-2C are progressive diagrams illustrating operation of a first example thrust-reverser actuation system during deployment and stowing of the thrust reverser doors.
Figure 2B:
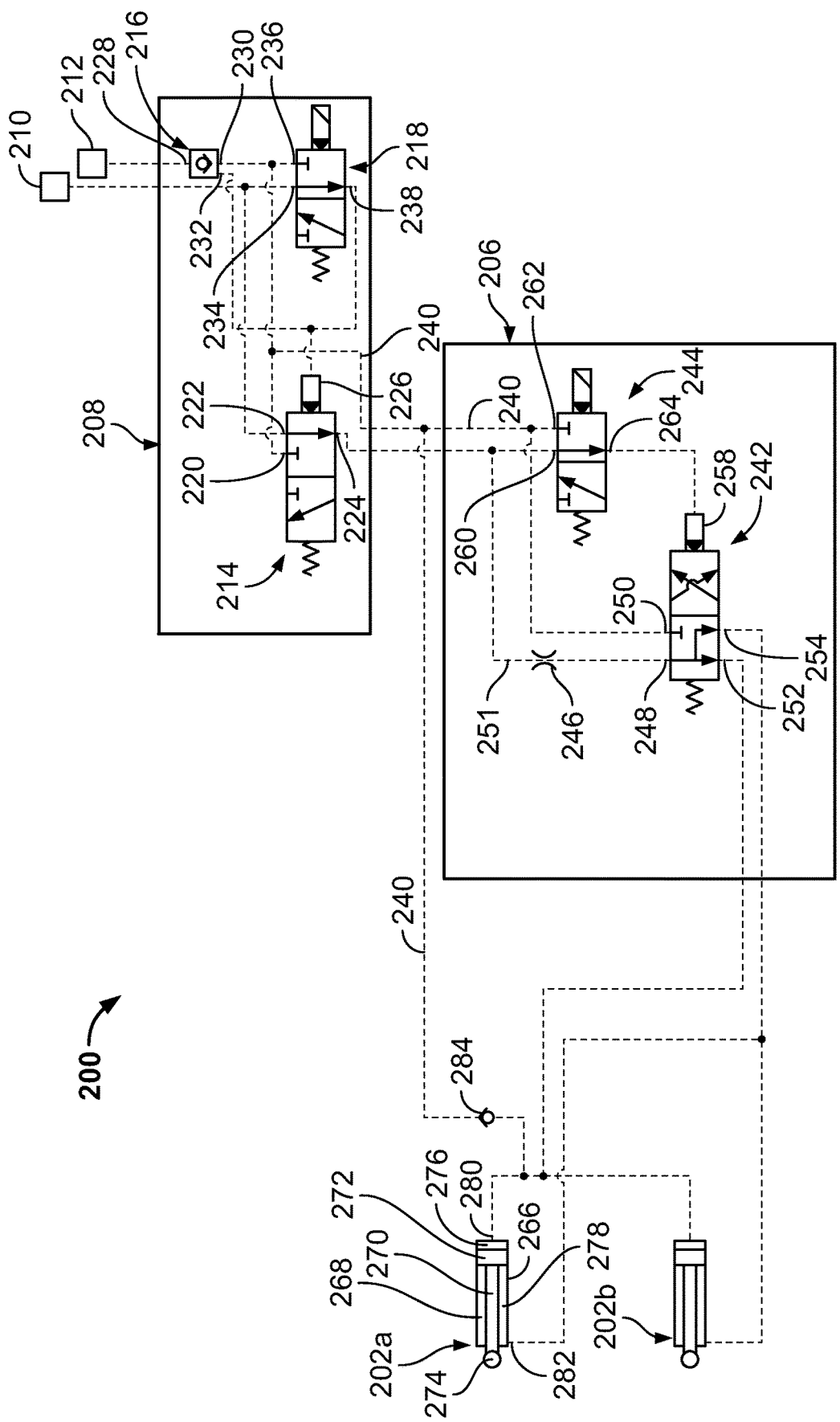
Figure 2C:
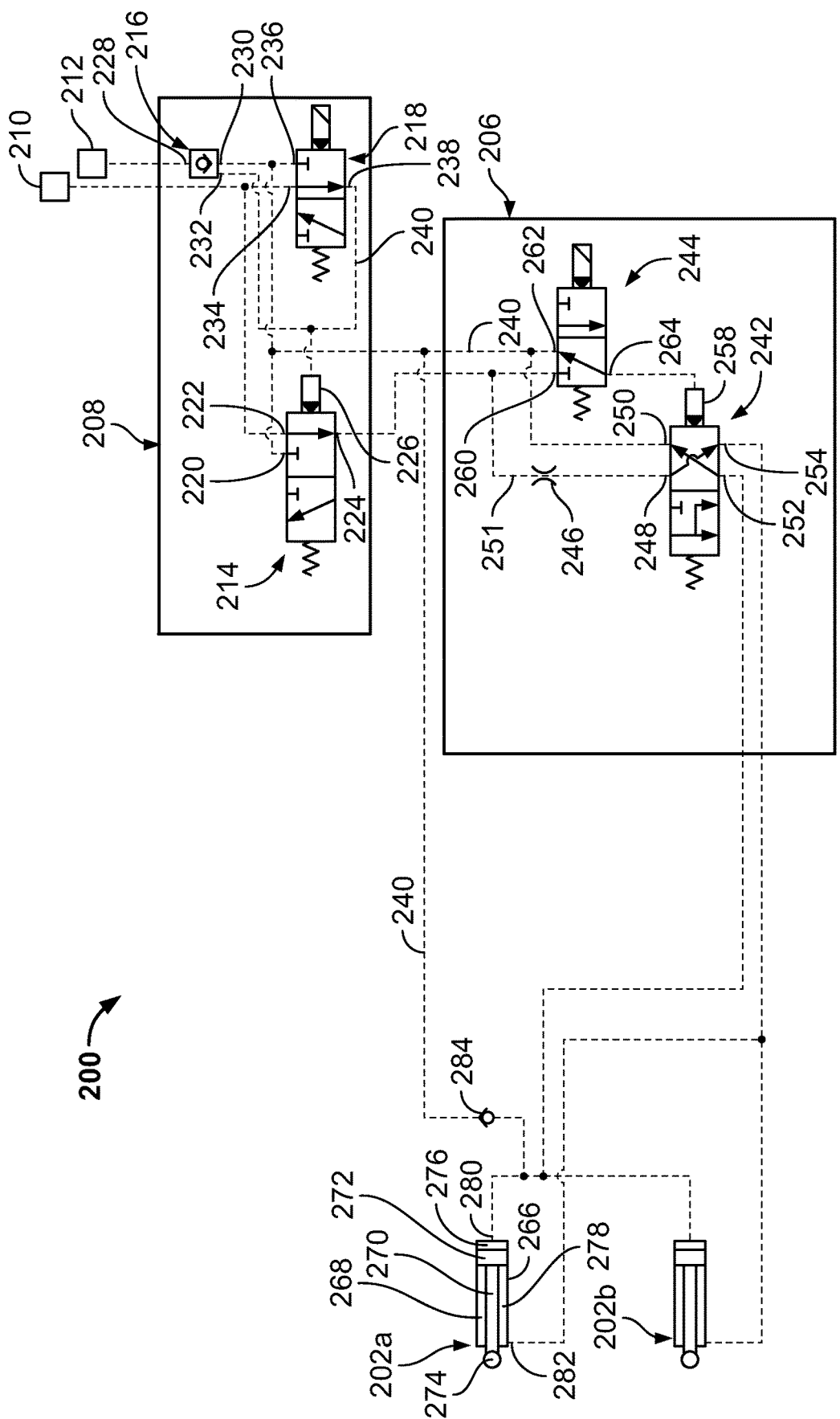

FIGS. 2A-2C illustrate a first example thrust reverser actuation system 200, such as may be used in conjunction with the example engine assembly 10 shown and described above with respect to FIGS. 1A and 1B. Thus, similar to the TRAS 100, the TRAS 200 includes first and second actuators 202a,b and a DCU 206 (the hydraulic locks are not shown in this example). The TRAS 200 further includes an isolation control unit 208 ("ICU"), a fluid source 210 and a fluid reservoir 212. The fluid source 210 may include one or more suitable pressure regulating apparatuses (e.g. a pump)

for controlling (e.g., increasing) the pressure of a working fluid (e.g., a hydraulic fluid). The fluid reservoir 212 may include one or more vessels for receiving working fluid passed through various components of the actuating system, containing the working fluid, and supplying the working fluid to the fluid source 210.

The DCU 206 is located upstream of the actuators 202a,b relative to the fluid source 210 and the fluid reservoir 212. As noted above, functional elements (described below) of the DCU 206 are operable to selectively route fluid between the fluid source 210, the actuators 202a,b, and the fluid reservoir 212 in order to transition the actuators (and the mechanically coupled thrust reverser doors) between stowed and deployed positions. The ICU 208 is located upstream of the DCU 206, and includes various functional elements (described below) operable to selectively inhibit or permit fluid flow between the DCU 206, the fluid source 210, and the fluid reservoir 212.

In this example, the ICU 208 includes an isolation control valve 214 ("ICV"), a piloted check valve 216, and a solenoid valve 218. The ICV 214 and solenoid valve 218 are each fluidically coupled to the fluid source 210 and fluid reservoir 212 by various fluid lines. The piloted check valve 216 is fluidically coupled to the fluid reservoir 212. As shown, with respect to the fluid reservoir 212, the check valve 216 is located upstream of all other functional components of the TRAS 200.

In this example, the ICV 214 is a spring-biased, three-port pressure regulating component, including a high pressure port 222 fluidically coupled to the fluid source 210, a low pressure port 220 fluidically coupled to the fluid reservoir 212, and a service port 224 fluidically coupled the DCU 206. The ICV 214 is configured to transition between a first stage, where fluid flow between the low pressure port 220 and the service port 224 is permitted (see FIG. 2A), and a second stage, where fluid flow between the high pressure port 222 and the service port 224 is permitted (see FIGS. 2B and 2C). Thus, when the ICV 214 is in the first stage, the DCU 206 is placed in fluid communication with the fluid reservoir 212, and when the ICV is in the second stage, the DCU is placed in fluid communication with the fluid source 210. The default stage of the ICV 214 is the first stage, which inhibits fluid flow into the DCU 206 for fire protection purposes. The ICV 214 further includes a pilot valve 226 that controls the transition from the first stage to the second stage, and vice versa.

The piloted check valve 216 is also a three-port valve, including a return-side port 228 fluidically coupled to the fluid reservoir 212, a system-side port 230 fluidically coupled to other downstream components of the TRAS 200, and a pilot port 232. Similar to the ICV 214, the check valve 216 is configured transition between a first stage and a second stage, with the first stage being the default. In the first, default stage, the check valve 216 only permits fluid flow in one direction—from the system-side port 230 to the return-side port 228. This stage only allows fluid to flow from the TRAS components to the fluid reservoir 212. In the second stage, the check valve 216 allows free fluid flow between return-side port 228 and system-side port 230. Thus, reverse flow from the fluid reservoir 212 to the TRAS components is permitted, unlike in the first stage of the check valve 216. Fluid pressure received at the pilot port 232 controls the transition from the first stage to the second stage, and vice versa. Like the ICV 214, the default stage of the check valve 216 is the first stage, which inhibits fluid flow from the fluid reservoir 212 into the DCU 206 for fire protection purposes.

The solenoid valve 218 is fluidically coupled to both the ICV 214 and the piloted check valve 216, and configured to hydraulically control these components to transition between different states/stages in response to a control signal—e.g., an activation/deactivation signal. Similar to the ICV 214, the solenoid valve 218 is a spring-biased, three-port device. Accordingly, the solenoid valve 244 includes a high pressure port 234 fluidically coupled to the fluid source 210, a low pressure port 236 fluidically coupled to the fluid reservoir 212, and an actuator port 238. The actuator port 238 is fluidically coupled with both the pilot valve 226 of the ICV 214 and the pilot port 232 of the check valve 216.

The solenoid valve 218 transitions between ON and OFF conditions based on a received activation/deactivation control signal. In the OFF condition (see FIG. 2A), fluid flow between the low pressure port 236 and the actuator port 238 is permitted, which places the pilot valve 226 of the ICV 214 and the pilot port 232 of the check valve 216 in fluid communication with the fluid reservoir 212. The relatively low pressure of the fluid reservoir 212 is insufficient to prompt a stage transition of either the ICV 214 or check valve 216. In the ON condition (see FIGS. 2B and 2C), fluid flow between the high pressure port 235 and the actuator port 238 is permitted, which places the pilot valve 226 of the ICV 214 and the pilot port 232 of the check valve 216 in fluid communication with the fluid source 210. Unlike the relatively low pressure of fluid reservoir 212, the relatively high pressure of fluid source 210 causes the ICV 214 and check valve 216 to transition from their first to second stages. Like the ICV 214 and check valve 216, the solenoid valve 218 defaults to the OFF condition to prevent unintentional fluid flow into the DCU 206.

The ICU 208 still further includes a low pressure line 240 downstream of the piloted check valve 216 that runs outside the ICV 214, and therefore remains in fluid communication with the fluid reservoir 212, subject to the directional flow control performed by the check valve 216. As described in greater detail below, the low pressure line 240 runs to both the DCU 206 and also to the first and second actuators 212a,b outside the DCU.

The DCU 206 includes a directional control valve ("DCV") 242, a solenoid valve 244, and a flow limiting device 246. In this example, the DCV 242 is a spring-biased, four port pressure regulating component. One side of the DCV 242 includes a control port 248 in fluid communication with the service port 224 of the ICV 214 and a low pressure port 250 in fluid communication with the fluid reservoir 212 via the low pressure line 240. The flow limiting device 246 is placed on the fluid line 251 between the control port 248 of the DCV 242 and the service port 224 of the ICV 214. The flow limiting device 246 is configured to inhibit the pressure/fluid draw by the actuators 202a,b through the DCV 242 on the fluid source 210 from surpassing a predetermined threshold during the deploy process (see FIG. 2B). In this example, the flow limiting device 246 is provided in the form of a flow restrictor. However, other suitable devices are also contemplated within the scope of the present disclosure. As noted above, limiting the flow demand can be advantageous because it allows the fluid source 210 and supporting system components (e.g., fluid lines, valves, etc.) to be appropriately provided in a configuration with practical weight, form factor/envelope, and cost. Regenerative and supplemental flow techniques described below are incorporated into the TRAS to accommodate this limited flow demand without sacrificing deployment performance.

The opposite side of the DCV 242 includes a deploy port 252 and a stow port 254 fluidically coupled to the actuators 212a,b. Similar to the ICV 214, the DCV 242 is configured to transition between a first stage and a second stage. The stage of the DCV 242 dictates flow between the ports on its two opposite sides. In the first, default stage of the DCV 242 (see FIGS. 2A and 2C), the control port 248 is fluidically coupled to the stow port 254, and the low pressure port 250 is fluidically coupled to the deploy port 252. In the second stage of the DCV 242 (see FIG. 2B), the control port 248 is fluidically coupled to both the stow and deploy ports 254, 256, and the low pressure port 250 is landed (e.g., fluidically isolated or plugged). The stow and deploy ports 254,256 are also placed in fluid communication with one another in the second DCV stage. The DCV 242 further includes a pilot valve 258 that controls the transition from the first stage to the second stage, and vice versa, based on hydraulic pressure signals from the solenoid valve 244.

The solenoid valve 244 is substantially similar in both structure and function to solenoid valve 218. The solenoid valve 244 is a spring-biased, three-port valve including a high pressure port 260 in fluid communication with the service port 224 of the ICV 214, a low pressure port 262 in fluid communication with the fluid reservoir 212 via the low pressure line 240, and an actuator port 264 in fluid communication with the pilot valve 258 of the DCV 242. In the default OFF condition, the actuator port 264 is fluidically coupled with the low pressure port 262, and fluidically coupled with the high pressure port in the ON condition. The solenoid valve 244 cause the DCV 242 to transition from the first stage to the second stage when the solenoid is in the ON condition and receiving relatively high pressure fluid from the service port 224 of the ICV 214 (i.e., when the solenoid valve 218 of the ICU 208 is in the ON condition, causing the ICV 214 to transition to its second stage).

The first and second actuators 202a,b are designed to move the respective doors (e.g., doors 24a,b shown in FIGS. 1A and 1B) of a thrust reverser (e.g., thrust reverser 22 of FIGS. 1A and 1B) between a stowed position and a deployed position. In this example, the first and second actuators 202a,b are substantially identical both structurally and functionally, and will therefore be described in unison. Each of the first and second actuators 202a,b includes a housing 266 having an interior cavity 268. The actuator housing 266 is mechanically coupled to the nacelle (e.g., nacelle 12) of the thrust reverser. The housing's interior cavity 268 receives an elongated actuator rod 270 including a piston member 272 at a proximal end and a coupler 274 at an opposite distal end. The coupler 274 attaches the actuator rod 270 to the door of the thrust reverser, such that the door moves (e.g., pivots) in response to movement by the actuator rod 270. The piston member 272 of the actuator rod 270 seals against the wall of the interior housing cavity 266, bifurcating the cavity into a deploy chamber 276 and a stow chamber 278. The actuator housing 266 further includes a first fluid port 280 leading to the deploy chamber 276 and a second fluid port 282 leading to the stow chamber 278. The first fluid port 280 is fluidically coupled to the DCV's deploy port 252, and the second fluid port 282 is fluidically coupled to the DCV's stow port 254.

The actuator rod 270 is movable within the interior cavity 268 of the housing 266. For example, the actuator rod 266 is movable in response to unbalanced fluid pressure force between the deploy and stow chambers 276,278 acting on the piston member 272. When the hydraulic pressure force in the deploy chamber 276 is greater than the hydraulic pressure force in the stow chamber 278, the actuator rod 270 moves "downward" to deploy the attached thrust reverser door. Conversely, when hydraulic pressure force in the stow chamber 278 is greater, the actuator rod 270 moves "upward" to stow the thrust reverser door. In this example, the first and second actuators 202a,b are "unbalanced," because the piston area exposed to fluid pressure in the deploy chamber 276 is greater than the piston area in the stow chamber 278 (due to the presence of the rod extending through the stow chamber). The greater piston area creates a greater hydraulic force output. As such, when the deploy and stow chambers 276,278 are at equal pressure, the actuator rod 270 will be urged downward to deploy the thrust reverser door due to the greater force output of the deploy chamber 276.

The above-described configurations of the DCV 242 and actuators 202a,b enables the recirculation of fluid during the deploy process. As previously discussed, the second stage of the DCV 242 places both of its deploy and stow ports 252,254 in fluid communication with the control port 248, which is fluidically linked to the service port 224 of the ICV 214. Thus, in this second DCV stage, both deploy and stow chambers 276,278 of the actuators 202a,b are exposed to the relatively high pressure fluid source 210, and isolated from the relatively low pressure fluid reservoir 212. The unbalanced configuration of the actuators 202a,b causes the actuator rods 270 to deploy the thrust reverser doors in this state of the system. As the doors begin to deploy, the force of surrounding airflow begins to pull the doors open, providing an "aiding load" that further urges the actuator rods 270 in the deploy direction. As the aiding load pulls the actuator rods 270, fluid is forced from the stow chambers 278 and simultaneously drawn into the deploy chambers 276, placing the former in high pressure and the latter in low pressure. Because the stow and deploy ports 254,256 are placed in fluid communication during the second DCV stage, fluid flows from the high-pressure stow chambers 278 into the low-pressure deploy chambers 276, which lessens the fluid flow demand placed on the fluid source 210. That is, absent recirculation, the low-pressure deploy chambers 276 would draw additional fluid from the fluid source 210.

Fluid flow demand during the deploy process is further lessened by supplemental fluid flow provided by the portion of the low pressure line 240 fluidically linking to fluid reservoir 212 to the deploy chambers 276. As shown, this fluid line 240 includes a check valve 284 that permits fluid flow in a single direction, from the fluid reservoir 212 to the deploy chambers 276. This supplemental fluid flow takes place during the deploy process when fluid recirculation combined with the limited primary fluid flow from the fluid source 210 is insufficient to meet the fluid draw of the deploy chambers 276. In this state, the pressure of the deploy chambers 276 falls below the pressure of the fluid reservoir 212, which instigates the supplemental fluid flow.

FIG. 2A illustrates the TRAS 200 in a stow condition, such as may be maintained during use while an aircraft is grounded or in flight. In the stow condition, the TRAS 200 is configured to inhibit fluid flow from the fluid source 210 to the DCV 242 and actuators 202a,b. Accordingly, solenoid valve 218 is placed in the OFF condition, which causes ICV 214 to remain in the default first stage. As described above, the first stage of the ICV 214 fluidically couples its service port 224 to the low pressure port 220, placing the DCU 206 in fluid communication with the low pressure fluid reservoir 212. Thus, fluid is allowed to flow from the DCU 206 to the fluid reservoir 212 to potentially evacuate fluid from the system, while fluid flow from the fluid source to the DCU is prevented.

FIG. 2B illustrates the TRAS 200 in a deploy-command condition. Here, the solenoid valve 218 is placed in the ON condition, which causes both the ICV 214 and piloted check valve 216 to transition from their respective first-to-second stages. In the second stage of the check valve 216, supplemental fluid flow from the fluid reservoir 212 to the downstream system components is permitted via low pressure line 240. In the second stage of the ICV 214, the service port 224 is fluidically coupled to the high pressure port 222, placing the DCU 206 in fluid communication with the pressurized fluid source 210.

Like the ICU solenoid valve 218, the DCU solenoid valve 244 is also placed in the ON condition, which causes the DCV 242 to transition from its default first stage to the second stage. In the second stage of the DCV 242, limited fluid flow (via the flow limiting device 246) from the service port 224 of the ICV 214 is routed to the deploy and stow chambers 276,278 of the actuators 202a,b to initiate deployment of the thrust reverser doors. As previously discussed, the internal hydraulic force provided by components of the actuating system 200 is complemented by an external aiding load that effectively pulls the thrust reverser doors open towards the deploy position. Fluid recirculation through the DCV 242 helps to satiate the fluid flow demand by the deploy chambers 276 of the actuators 202a,b. When the pressure in the deploy chambers 276 drops below the return fluid reservoir 212, return fluid is drawn into the chambers via the low pressure line 240 to prevent cavitation.

FIG. 2C illustrates the TRAS 200 in a stow-command condition. The components of the ICU 208 are operated identically to the deploy-command condition, with the solenoid valve 218 is placed in the ON condition, and the ICV 214 in the second stage to provide fluid flow from the fluid source 210 to the DCU 206. However, in this case, the DCU solenoid valve 244 is placed in the OFF condition, which places the DCV 242 in the default first stage. In the first DCV stage, the deploy chambers 276 of the actuators 202a,b are placed in fluid communication with the fluid reservoir 212, and the stow chambers 278 are placed in fluid communication with the fluid source 210. The high pressure stow chambers 278 and low pressure deploy chambers causes an unbalanced condition across the actuator piston members 272, which urges the actuator rods 270 "upward" toward the stow position.

Figure 3:
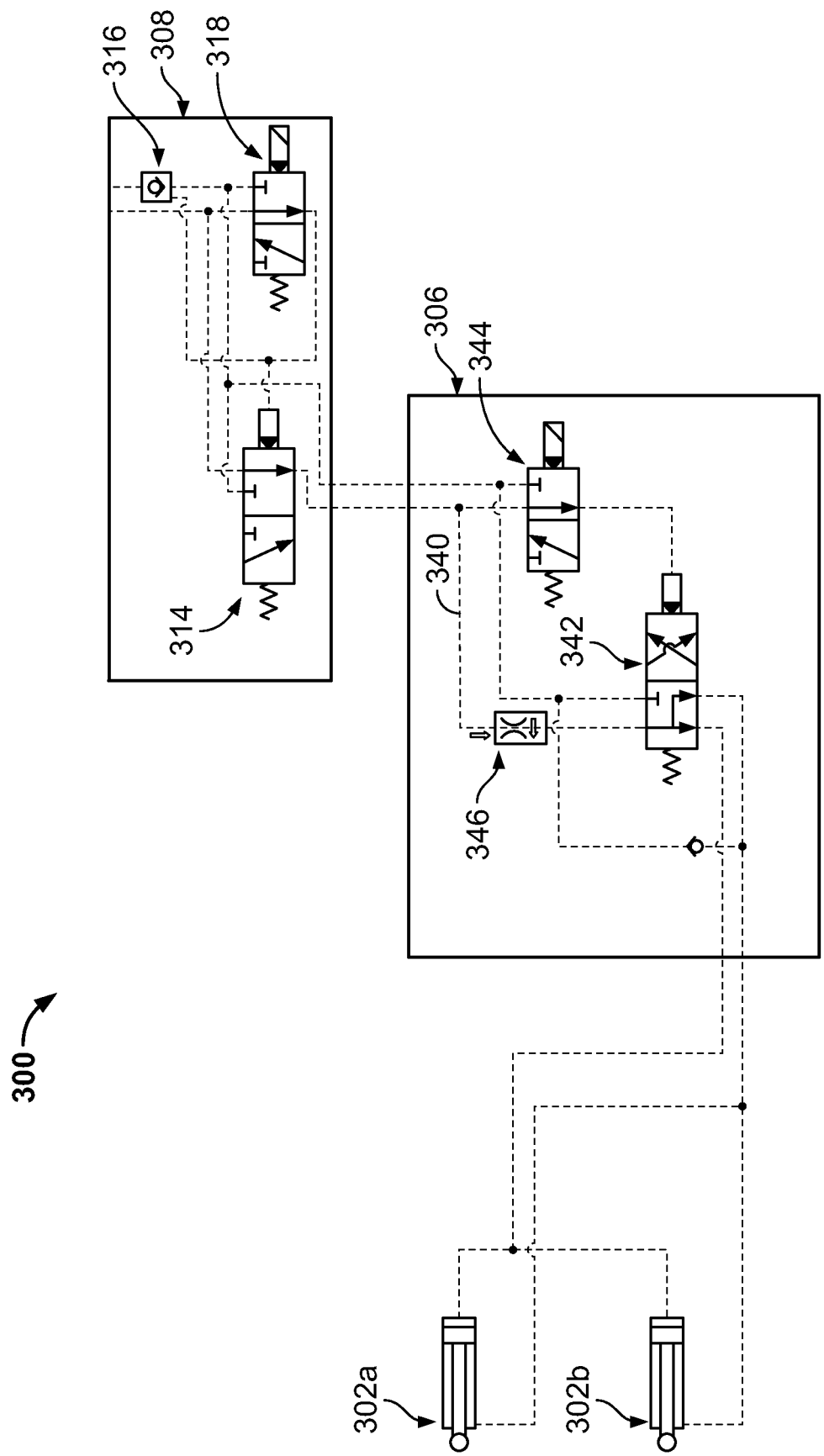
FIG. 3 is a diagram illustrating a second example thrust-reverser actuation system.

FIG. 3 illustrates a second example TRAS 300. This second example, is similar to the first example TRAS 200, featuring first and second actuators 302a,b, DCU 306, and an ICU 308. The ICU 308 includes an ICV 314, a piloted check valve 316, each of which is controlled by a solenoid valve 318. The DCU 306 includes a DCV 342 controlled by a solenoid valve 344. The second example TRAS 300 functions the manner described above, with the ICU 308 regulating fluid flow between a pressurized fluid source 310, a fluid reservoir 312, as well as the DCU 306 and actuators 302a,b. However, in this example, the low pressure fluid line 340 between the fluid reservoir 312 and the deploy chambers of actuators 302a,b is incorporated within the DCU 306. Notably, even in this example, the low pressure line 340 runs outside the ICV 314 and DCV 342. As another difference between the first and second example TRAS 200,300, in this instance, the flow limiting device 346 is provided in the form of a flow regulating device, as opposed to a flow restrictor. A flow regulator may be particularly advantageous in implementations where it is desirable to maintain a constant flow rate regardless of pressure differential.

The use of terminology such as "front," "rear," "top," "bottom," "raised," "lowered," "upwards," and "downwards" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

A number of embodiments of the invention have been described. Nevertheless, it will be understood that various modifications may be made without departing from the spirit and scope of the inventions.

What is claimed is:

1. A method of operating an engine thrust reverser comprising a thrust-reversing element movable between a stowed position and a deployed position, the method comprising:
   transitioning the thrust-reversing element from the stowed position to the deployed position by:
   conveying a primary fluid flow from a pressurized fluid source to a hydraulic actuator coupled to the thrust-reversing element;
   operating a piloted check valve in a first stage;
   inhibiting, by the piloted check valve in the first stage, fluid flow from a fluid return reservoir to the hydraulic actuator through one or more bypass fluid lines;
   operating the piloted check valve in a second stage;
   flowing, by the piloted check valve in the second stage, a secondary fluid flow from the fluid return reservoir to the hydraulic actuator, the secondary fluid flow being separate from the primary fluid flow; and
   while conveying the primary fluid flow and the secondary fluid flows, limiting the primary fluid flow to a predetermined flow threshold;
   the engine thrust reverser further comprises:
   a directional control unit including a directional control valve operable to selectively route fluid between the pressurized fluid source, the hydraulic actuator, and the fluid return reservoir; and
   the one or more bypass fluid lines providing fluid communication between the hydraulic actuator and the fluid return reservoir independent of the directional control valve.

2. The method of claim 1, wherein:
   the thrust-reversing element comprises a nacelle configured to at least partially surround an engine;
   the hydraulic actuator is operably coupled to move the thrust-reversing element between the stowed position and the deployed position;
   the engine thrust reverser further comprises:
   a fluid control system configured to operate the hydraulic actuator;
   wherein limiting the primary fluid flow to the predetermined flow threshold comprises inhibiting, by a flow limiter residing between the pressurized fluid source and the directional control valve, a pressure draw by the hydraulic actuator from surpassing a predetermined threshold.

3. The method of claim 2, further comprising operating an isolation control valve of an isolation control unit of the fluid control system to selectively inhibit or permit fluid flow between the directional control valve and the pressurized fluid source and the fluid return reservoir.

4. The method of claim 3,
wherein the isolation control unit comprises the piloted check valve.

5. The method of claim 4, further comprising concurrently controlling, by a solenoid valve coupled to both the isolation control valve and the piloted check valve, operation of the isolation control valve and the piloted check valve.

6. The method of claim 5, further comprising initiating, by the solenoid valve, transition of the piloted check valve from the first stage to the second stage in response to receiving a thrust-reverser-deploy command.

7. The method of claim 2, further comprising:
operating the directional control valve in a deploy stage in which a deploy chamber and a stow chamber of the hydraulic actuator are placed in fluid communication with one another to permit fluid recirculation;
routing, by the directional control valve, fluid to both the deploy chamber and the stow chamber;
operating the directional control valve in a stow stage; and
routing, by the directional control valve, fluid from the pressurized fluid source to only the stow chamber of the hydraulic actuator.

8. The method of claim 2, further comprising permitting, by an anti-cavitation check valve residing on a bypass fluid line of the one or more bypass fluid lines, fluid flow from the fluid return reservoir to the hydraulic actuator, while inhibiting fluid flow from the hydraulic actuator to the fluid return reservoir.

9. The method of claim 8, further comprising permitting, by the anti-cavitation check valve, fluid flow when pressure in a deploy chamber of the hydraulic actuator is less than pressure at the fluid return reservoir.

10. The method of claim 2, wherein the flow limiter comprises at least one of a flow regulator or a flow restrictor.

11. The method of claim 2, wherein the flow limiter is incorporated in the directional control unit.

\* \* \* \* \*